Oct. 13, 1959    A. VEITH ET AL    2,908,076
PLATE SHEARS
Filed March 19, 1957    2 Sheets-Sheet 2
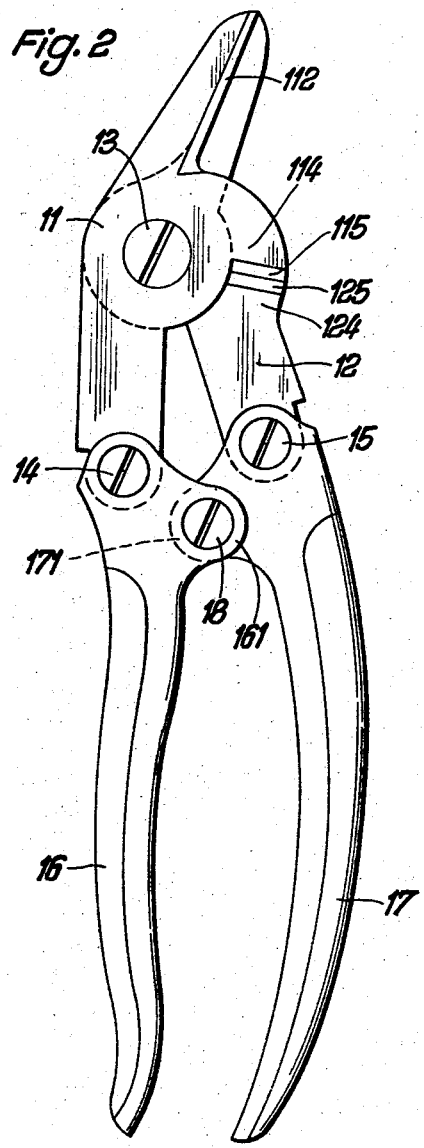
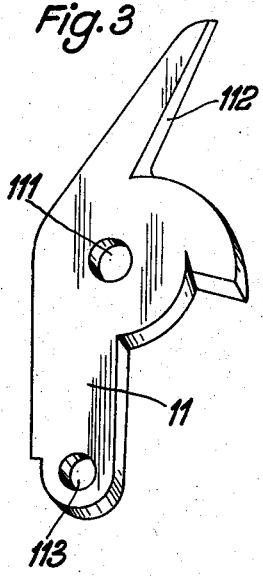
Inventor:
Adam Veith and August
Veisenberger
By Emmet R Montague
Attorney

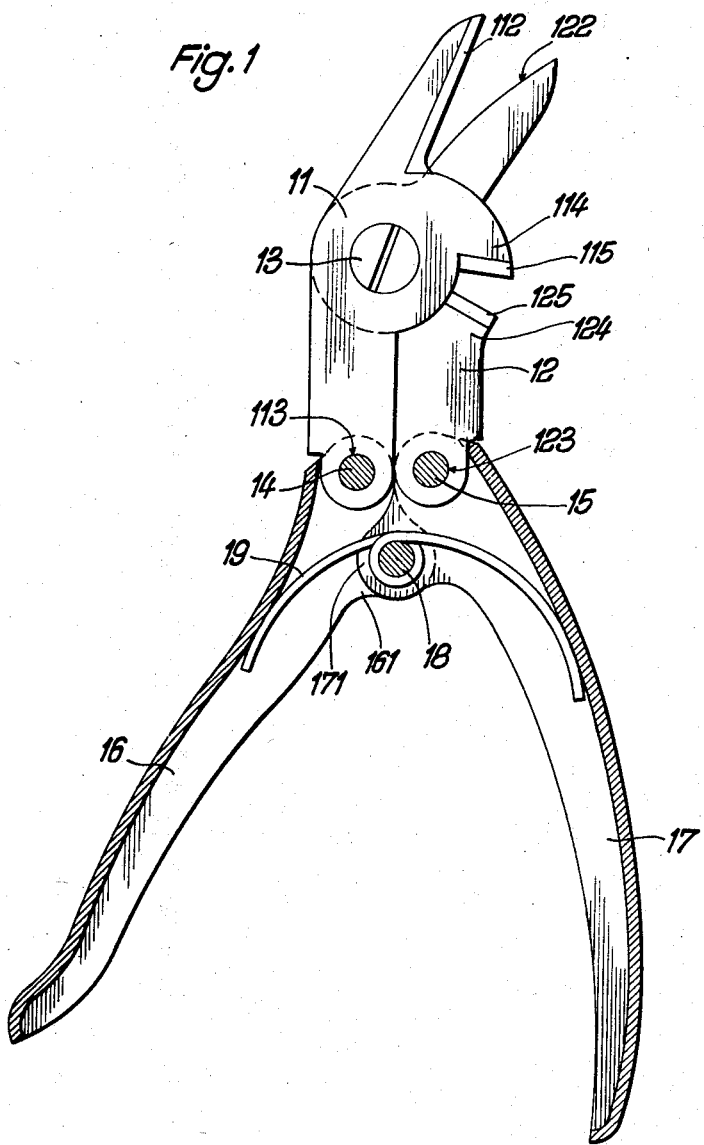

United States Patent Office 2,908,076
Patented Oct. 13, 1959

2,908,076

PLATE SHEARS

Adam Veith, Frankfurt am Main-Fechenheim, and August Weisenburger, Frankfurt am Main, Germany Application March 19, 1957, Serial No. 647,029

Claims priority, application Germany March 24, 1956

1 Claim. (Cl. 30—227)

The present invention relates to plate shears.

In certain known shears, there are provided two two-arm shearing levers pivoting with reference to each other and operatively connected for power increasing purposes to handle-forming levers also pivotally secured to each other. In such cases the actual shearing levers always cross each other at their point of pivotal connection.

It is one object of the present invention to provide plate shears, wherein starting from the fact that such a crossing of the shearing levers is highly objectionable in particular when the shears serve for running through an entire plate or over a table, the two-arm shearing levers pivot relative to each other and are connected for power-increasing purposes with handle-forming levers which are also pivoting with reference to each other, the shearing arms being however pivotally connected relative to each other without crossing each other. This leads also to the further advantage that it is possible to associate an auxiliary wire-cutter with the plate shears in a very simple manner.

It is another object of the present invention to provide plate shears, wherein two-arm handle forming levers are arranged, the pivotal connection between which levers is located on the side facing away from the pivotal connection between the shearing levers, of the connecting line passing through the two pivotal connecting points between the handle and the actual shearing levers.

It is yet another object of the present invention to provide plate shears, wherein for the fitting of an auxiliary wire-cutter on the outside of the opening formed by the shearing levers, the two cutting members of the wire-cutter are formed directly on the corresponding shearing levers, this being performed advantageously by forming the cutters on the wire-cutter by means of projections on said levers, said projections extending to either side of the pivot.

In addition thereto, it is preferable to make the wire-cutter blades extend radially with reference to the shearing lever pivot, to define with the blades on the shearing levers an angle almost equal to an angle of 90°, but not more, and lying in the same plane as the shearing blades.

With these and other objects in view which will become apparent in the following detailed description, the present invention will be clearly understood in connection with the accompanying drawings, in which:

Figure 1 shows the plate shears in their open condition;

Fig. 2 shows the same shears in their closed position; and

Fig. 3 is a view of one of the shearing levers.

Referring now to the drawings, the shearing section of the plate shears illustrated includes a lower two-arm shearing lever 11 and an upper also two-arm shearing lever 12. The pivotal system associating the two shearing levers is constituted by a threaded pivot 13 extending through corresponding bores in the shearing levers as shown at 111 in Fig. 3. One of the blades provided for cutting metal plates is shown at 112 on the lower shearing lever 11 while the cutting blade 122 on the upper shearing lever 12 is visible in Fig. 1 only. In the free ends of these lever arms of the shearing levers 11 and 12 which are not provided with cutting blades, there are formed pivot-carrying bores 113 and 123 adapted to be engaged by the screws 14 and 15 serving as pivots.

By means of the screws 14 and 15, the ends of the two-arm handle-forming levers 16 and 17 are secured to the shearing levers to form the pivotal connection between the handle or grip and the actual shears. These two hand-operable grip levers 16 and 17 are also pivotally connected together by means of a threaded pivot 18 extending through the projecting overlapping lugs 161 and 171 formed on said grip levers. Over this pivot 18 is fitted also a spreader spring 19 urging the grip or handle-forming levers 16 and 17 apart, so as to hold the shears in their open position.

On the shearing lever 12 is also provided an auxiliary projection 124 having a cutting edge at 125, said projection lying on the same side of the shear pivot 13 as the remainder of the shearing lever 12. Furthermore, the other shearing lever 11 is also provided with a projection 114 extending on the other side of the pivot 13 and forming the counter blade 115 for the cutting edge on the projection 124. These two cutting edges 125 and 115 constitute together a wire-cutter.

While I have disclosed one embodiment of the present invention, it is to be understood that this embodiment is given by example only and not in a limiting sense, the scope of the present invention being determined by the objects and the claim.

We claim:

Plate shears comprising two grip-forming two-arm levers pivotally connected to each other, two two-arm shearing levers provided along the co-operating edges of their outer arms with a shearing edge, said shearing levers being pivotally secured together without crossing each other, and pivots pivotally connecting the inner non-cutting arm of each of said shearing levers with corresponding arms of said grip-forming levers, and said pivots lying on opposite sides of a first imaginary line connecting the pivot point between said grip-forming levers with the pivot point between said shearing levers and said two pivot points lying on opposite sides of a second imaginary line connecting said two pivots, co-operating projections on the same side of said first mentioned imaginary line, connecting said two pivot points, integrally formed with said corresponding shearing levers and forming co-operating wire-cutting edges, said co-operating projections being disposed on the same side of said first imaginary line connecting said two first mentioned pivot points and forming co-operating wire-cutting edges extending radially relative to said pivot point connecting said two shearing levers, said co-operating projections having co-operating wire-cutting edges forming with said shearing edges of said shearing levers an angle of no more than 90°, said co-operating wire-cutting edges being disposed substantially on the same plane as the shearing edges of said shearing levers, said shearing edges being offset at an acute angle relative to said first imaginary line.

References Cited in the file of this patent

UNITED STATES PATENTS

| 134,064 | Ives | Dec. 17, 1872 |
| 299,033 | Stevens | May 20, 1884 |
| 349,496 | Hayden | Sept. 21, 1886 |
| 955,287 | Schofield | Apr. 19, 1910 |
| 1,909,846 | Porter | May 16, 1933 |
| 2,287,303 | Habart et al. | June 23, 1942 |

FOREIGN PATENTS

| 1,047,245 | France | July 22, 1952 |